(12) United States Patent
Yildiz et al.

(10) Patent No.: US 12,333,067 B2
(45) Date of Patent: Jun. 17, 2025

(54) DETECTING UNEXPECTED USER INTERFACE BEHAVIOR USING PHYSIOLOGICAL DATA

(71) Applicant: Apple Inc., Cupertino, CA (US)

(72) Inventors: Izzet B. Yildiz, Sunnyvale, CA (US); Grant H. Mulliken, Los Gatos, CA (US); Sterling R. Crispin, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/027,644

(22) PCT Filed: Sep. 15, 2021

(86) PCT No.: PCT/US2021/050360
§ 371 (c)(1),
(2) Date: Mar. 22, 2023

(87) PCT Pub. No.: WO2022/066476
PCT Pub. Date: Mar. 31, 2022

(65) Prior Publication Data
US 2023/0376107 A1    Nov. 23, 2023

Related U.S. Application Data

(60) Provisional application No. 63/082,188, filed on Sep. 23, 2020.

(51) Int. Cl.
*G06F 3/01* (2006.01)
(52) U.S. Cl.
CPC ........ *G06F 3/013* (2013.01); *G06F 2203/011* (2013.01)

(58) Field of Classification Search
CPC .......... G06F 3/013; G06F 3/011; G06F 3/017; G06F 3/012; G06F 3/04883;
(Continued)

(56) References Cited

U.S. PATENT DOCUMENTS

| 2010/0108425 | A1* | 5/2010 | Crespo | B60K 28/063 180/272 |
| 2013/0194177 | A1* | 8/2013 | Sakata | H04N 21/4223 345/156 |

(Continued)

OTHER PUBLICATIONS (PCT) European Patent Office (ISA/EP), International Search Report and Written Opinion of the International Searching Authority, International Application No. PCT/US2021/050360, 13 pages, Jan. 7, 2022.

(Continued)

*Primary Examiner* — Dong Hui Liang
(74) *Attorney, Agent, or Firm* — Thompson Hine LLP

(57) ABSTRACT

Some implementations disclosed herein provide systems, methods, and devices that use physiological data (e.g., indicative of surprise) of a user to determine that an unexpected user interface behavior occurred. In some implementations, a device having a processor implements a method. The method obtains, via a sensor, physiological data of a user during a period of time and uses the physiological data to determine a characteristic of the user during the period of time while the user is using the electronic device. The method identifies an unexpected user interface behavior occurring prior to the period of time based on the characteristic of the user during the period of time.

26 Claims, 5 Drawing Sheets

(58) Field of Classification Search
CPC .. G06F 3/0488; G06F 3/0482; G06F 3/04842;
G06F 3/0481; G06F 3/005; G06F 3/0304;
G06F 3/04817; G06F 3/0484; G06F
3/04845; G06F 3/016; G06F 3/03545;
G06F 3/04847; G06F 1/163
See application file for complete search history.

(56) References Cited

U.S. PATENT DOCUMENTS

| | | | | |
|---|---|---|---|---|
| 2015/0220157 | A1* | 8/2015 | Marggraff | G06F 3/0485 |
| | | | | 345/156 |
| 2015/0261318 | A1* | 9/2015 | Scavezze | G06F 3/017 |
| | | | | 345/158 |
| 2016/0307038 | A1* | 10/2016 | Skogö | G06F 21/316 |
| 2017/0068316 | A1* | 3/2017 | Seok | G06F 3/0237 |
| 2017/0235706 | A1* | 8/2017 | Esterly | G06F 3/0481 |
| | | | | 715/243 |
| 2018/0025245 | A1* | 1/2018 | Sezgin | G06V 40/19 |
| | | | | 382/103 |
| 2018/0177451 | A1 | 6/2018 | Sahin | |
| 2018/0364810 | A1* | 12/2018 | Parshionikar | G06F 3/013 |
| 2019/0308641 | A1 | 10/2019 | Sato | |
| 2020/0000409 | A1 | 1/2020 | Hochman | |
| 2020/0103967 | A1 | 4/2020 | Bar-Zeev et al. | |
| 2020/0225799 | A1* | 7/2020 | Marra | G06F 3/013 |
| 2023/0069764 | A1 | 3/2023 | Jonker et al. | |

OTHER PUBLICATIONS

Kraft, A. et al., "A Systematic Approach to Developing Near Real-Time Performance Predictions Based on Physiological Measurements", 2017 IEEE Conference on Cognitive and Computational Aspects of Situation Management (CogSIMA), IEEE, 2017.
Li, Y. et al., "A EOG-based switch and its application for 'start/stop' control of a wheelchair," Neurocomputing, vol. 275, pp. 1350-1357, 2017.

* cited by examiner

DETECTING UNEXPECTED USER INTERFACE BEHAVIOR USING PHYSIOLOGICAL DATA

CROSS-REFERENCE TO RELATED APPLICATIONS

This patent application is the national stage of International Application No. PCT/US2021/050360 filed on Sep. 15, 2021, which claims the benefit of U.S. Provisional Application No. 63/082,188 filed on Sep. 23, 2020, entitled "DETECTING UNEXPECTED USER INTERFACE BEHAVIOR USING PHYSIOLOGICAL DATA," each of which is incorporated herein by this reference in its entirety.

TECHNICAL FIELD

The present disclosure generally relates to providing improved user experiences on electronic devices, and in particular, to systems, methods, and devices that detect user interface behavior that differs from user expectations.

BACKGROUND

Existing computer-based techniques for providing user interfaces provide features that respond to user input, e.g., touch screen contacts, touch screen gestures, spoken commands, gaze-based input, controller input, keyboard input, mouse input, etc. Unexpected user interface responses and other user interface behavior may occur. For example, user interface behavior may involve false positives in which a user interface falsely detects input and responds even though the input was not actually provided or false negatives in which the user interface fails to detect input that was provided. Existing techniques may not adequately detect such unexpected user interface behaviors.

SUMMARY

Some implementations disclosed herein provide systems, methods, and devices that use physiological data (e.g., indicative of surprise, shock, negative reaction, etc.) of a user to determine that an unexpected user interface behavior occurred. In some implementations, a device having a processor implements a method. The method obtains, via a sensor, physiological data of a user during a period of time while the user is using the electronic device and uses the physiological data to determine a characteristic of the user during the period of time. The method identifies an unexpected user interface behavior occurring prior to the period of time based on the characteristic of the user during the period of time. In some implementations, given physiological data for a period of time, e.g., a 300 ms time window, the method identifies a false negative, e.g., missing detection of a user-to-object contact or other user-movement-based selection. In some implementations, given physiological data for a period of time the method identifies a false positive, e.g., detection of a user-to-object contact or other user selection when such content or selection did not actually occur. In some implementations, a classifier or other machine learning model is used to perform the identification.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
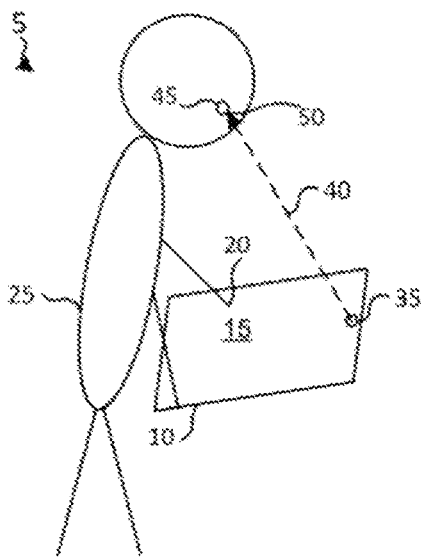
FIG. 1 illustrates a device providing a user interface and obtaining physiological data from a user while the user is using an electronic device.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a physical environment 5 including a device 10 configured to present a user interface 15 and obtain physiological data (e.g., eye data, EEG data, etc.) from the user 25 via a sensor 35 on device 10. The device 10 may implement one or more of the techniques disclosed herein to obtain the physiological data, determine a user characteristic based on the physiological data, and identify unexpected user interface behavior based on the user characteristic. In FIG. 1, the user 25 uses the device 10 while interacting with one or more objects in the physical environment. Sensors 35 on the device 10 are configured to capture physiological data (e.g., based on the sensor capturing images of the user 25, contacting the skin of the user 25, etc.). During use of the device 10, the user 25 may view a user interface 15 presented on the device 10 and interact with the user interface 15, for example, by touching finger 20 to a touch screen of the device 10.

Physiological data obtained by the sensors 35 of device 10 may be used to identify an unexpected user interface behavior based on a characteristic of the user 25. In some implementations, given physiological data, a false negative is identified, e.g., identifying a missed detection of a user-to-object contact or other user-movement-based selection. In some implementations, given physiological data, a false positive is identified, e.g., identifying that there was a false detection of a user-to-object contact or other user selection when such content or selection did not actually occur.

While the device 10 is illustrated in FIG. 1 as a mobile device, other implementations involve devices of other types. In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as a head mounted device (HMD), watch, armband, bracelet, necklace, anklet, or ring.

Moreover, while these examples and other examples discussed herein illustrate a single device 10 in a physical environment 5, the techniques disclosed herein are applicable to multiple devices as well as to multiple real-world environments. For example, the functions of device 10 may be performed by multiple devices.

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content.

In some implementations, the device 10 has a user interface (e.g., a graphical user interface GUI), one or more processors, memory and one or more modules, programs or sets of instructions stored in the memory for performing multiple functions. In some implementations, the user 25 interacts with the user interface through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes of the user 25, including one or both pupils of the user, present physiological data in the form of a pupillary response. The pupillary response of the user 25 results in a varying of the size or diameter of the pupil, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

Figure 2:
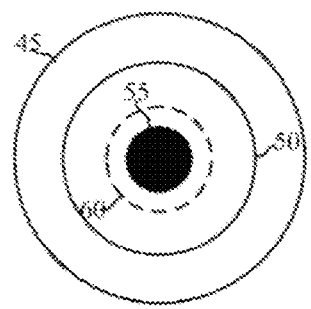
FIG. 2 illustrates a pupil of the user of FIG. 1 prior to an unexpected user interface behavior.

FIG. 2 illustrates a pupil 50 of the eye 45 of the user 25 of FIG. 1. As shown in FIG. 1, a present physiological state (e.g., present pupil diameter 55) may vary in contrast to a past physiological state (e.g., past pupil diameter 60). For example, the present physiological state may include a present pupil diameter and a past physiological state may include a past pupil diameter. The physiological data may represent a response pattern that dynamically varies over time.

Figure 3:
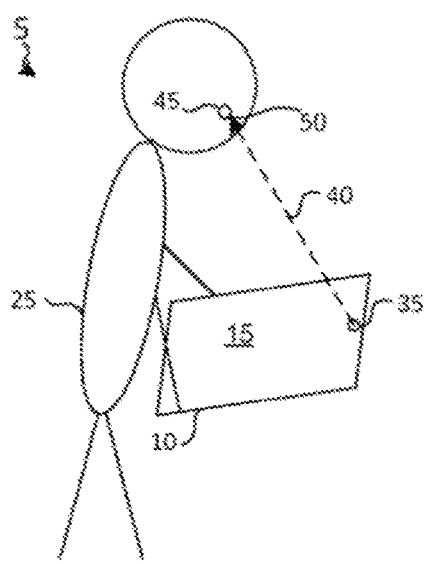
FIG. 3 illustrates the device of FIG. 1 presenting unexpected user interface behavior to the user.

FIG. 3 illustrates the device 10 of FIG. 1 presenting the user interface 15 with unexpected user interface behavior to the user 25. The user, upon seeing the user interface behavior and reacting to it, may exhibit a physiological response or otherwise exhibit a user characteristic that is captured by sensors 35. For example, the user's eye may respond with a new state, a change, or a pattern that is observed by sensors 35 and classified by an algorithm (e.g., using a threshold or machine learning model) on device 10 as a user response corresponding to an indication of unexpected user interface behavior.

Figure 4:
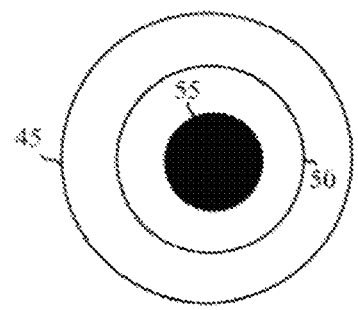
FIG. 4 illustrates the pupil of the user of FIG. 3 following the unexpected user interface behavior.

FIG. 4 illustrates the pupil of the user of FIG. 3 following the unexpected user interface behavior. In this example, the present pupil diameter 55 is dilated relative to its the pupil diameter illustrated in FIG. 2. The change in pupil diameter may be recognized as an indication of an unexpected user interface behavior based on one or more characteristics of the change (e.g., magnitude, pattern over time, timing with respect to a user interface action, timing with respect to a user action that was not identified as a user input, etc.). Additional information may be used to identify the unexpected user interface behavior. For example, a user subsequently initiating an undo action or the user repeating a previous action (e.g., one performed just before the user characteristic was detected) such as pointing or gesturing that was not identified as a user input.

Figure 5:
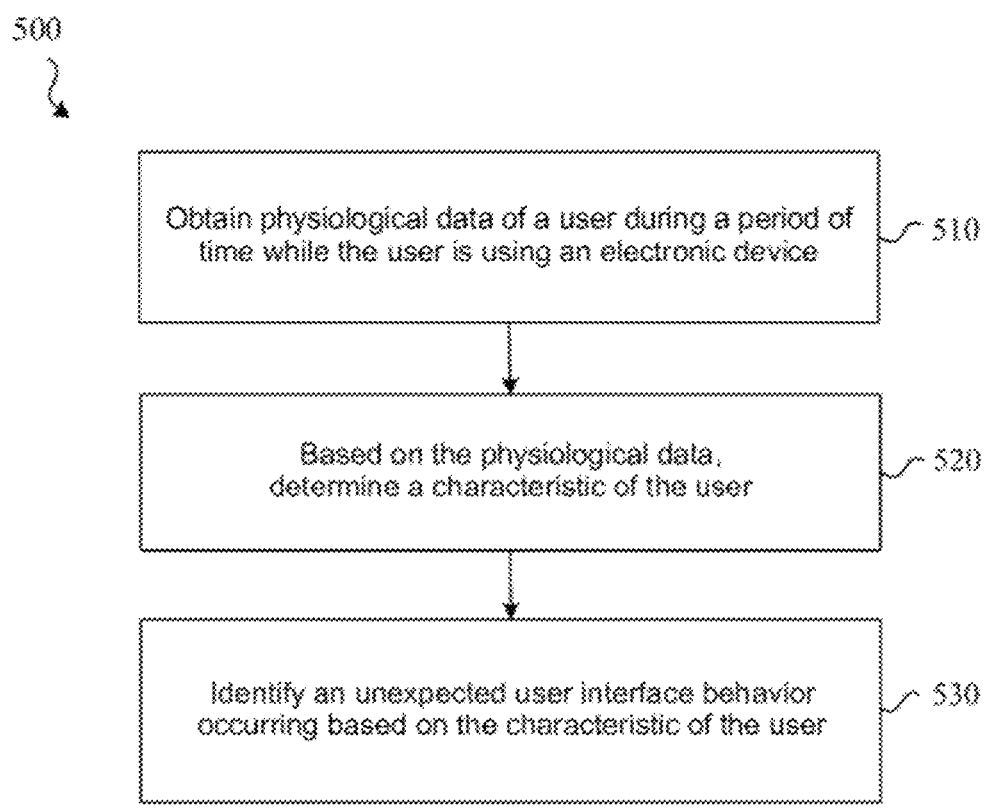
FIG. 5 is a flow chart illustrating an exemplary method of identifying unexpected user interface behavior using physiological data.

FIG. 5, in accordance with some implementations, is a flowchart representation of a method 500 for identifying unexpected user interface behavior using physiological data. In some implementations, the method 500 is performed by one or more devices (e.g., device 10). The method 500 can be performed at a mobile device, HMD, desktop, laptop, or server device. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 obtains physiological data of a user during a period of time while the user is using an electronic device. As examples, this may involve obtaining images of the eye, electrooculography (EOG) data measuring corneo-retinal standing potential from which gaze direction/movement can be determined, electromyography (EMG) data measuring muscle-generated signals. The period of time may be a fixed window of time, e.g., 100 ms, 200 ms, 300 ms, 400 ms, 500 ms, etc. Heart data may be obtained using via an electrocardiography (ECG) or other heart sensor. Blood data may be obtained via a blood sensor. Breath data may be obtained via a breadth or other body sensor. Brain data may be obtained via an electroencephalography (EEG) sensor or other brain sensor. Various other sensors may be additionally or alternatively be used to obtain the physiological data of the user.

At block 520, based on the physiological data, the method 500 determines a characteristic of the user during the period of time. In some implementations, the characteristic relates to gaze direction, gaze speed, gaze direction changes, pupil radius, pupil dilation, and/or pupil constriction. In some implementations, an inward facing camera on a head-mounted device (HMD) captures images of the user's eye and one or more eye characteristics are determined via a computer vision technique. In some implementations, the characteristic relates to muscle state based on electromyography (EMG) data. In some implementations, the characteristic relates to a heart rate change or pattern that is detected based on heart data. In some implementations, the characteristic relates to a change or pattern in blood pressure, blood oxygen, or blood glucose detected based on blood data. In some implementations, the characteristic relates to a change or pattern of breathing that is detected based on breath data. In some implementations, the characteristic relates to a brain activity change or pattern that is detected based on brain data. In some implementations, the characteristic is a combination of multiple user characteristics, e.g., both eye and muscle characteristics.

At block 530, based on the characteristic of the user, the method 500 identifies an unexpected user interface behavior. One or more user characteristics may be indicative of the unexpected user interface behavior. For example, during a time period following a detected user-to-object content or other user interface input, the gaze of a user may stabilize, and this stabilization may be an eye characteristic determined based on the physiological data that is indicative that the detected input should not have been detected as an input. In some implementations, identifying the unexpected user interface behavior involves determining that a user interface behavior is unexpected based on detecting that the physiological data indicates a type of reaction to the user interface behavior that is associated with an unexpected event occurring rather than an expected event occurring.

In some implementations, a machine learning model is trained to detect unexpected user interface behaviors. Such a model may be trained to classify physiological data corresponding to a window of time as indicative of an unexpected user interface behavior occurring just before the window of time or as not indicative of an unexpected user interface behavior occurring just before the window of time. Training data may be obtained and used from a sample population of general users, e.g., including physiological data sets associated with known scenarios, e.g., circumstances in which the user interface correctly identified user input being received, correctly identified no user input being received, the user interface incorrectly identifying user input being received, and the user interface failing to identify user input being received. In some implementations, a machine learning model is trained and used to identify additional or alternative types of user interface behaviors, e.g., circumstances in which a user provides one type of user input (e.g., a pointing gesture) and a second type of user input is detected (e.g., a swipe gesture). User preferences and privacy should be respected, as examples, by ensuring the user understands and consents to the use of user data, understands what types of user data are used, has control over the collection and use of user data, and limiting distribution of user data, for example, by ensuring that user data is processed locally on the user's device.

In some implementation, an algorithm or machine learning model used to detect unexpected user interface behavior is customized or personalized for a particular user. For example, training data to train a machine learning model may be automatically generated based when a user initiates an undo command. In such a circumstance, the user input that resulted in the action that was undone and physiological data associated with the time period following that user input may be used to train a machine learning model to identify subsequent instances of similar unexpected user behavior.

In some implementations, an unexpected user interface behavior is detected and a response is automatically initiated. For example, this may involve correcting a previous action automatically, e.g., providing an automatic action or an automatic undo. In some implementations, an unexpected user interface behavior is detected and determined to be a false negative. In this example, the interface response may be automatically revised, providing a mouse click, selection, or other user interface input/interaction based on the state of the environment, e.g., the user's hand position, the cursor position, etc., at the time when the input/interaction should have been detected. In some implementations, an unexpected user interface behavior is detected and determined to be a false positive. In this example, the interface response may be automatically reversed, e.g., reversing/undoing the last interface action. In other implementations, an unexpected user interface behavior may be associated with both a false negative (e.g., the intended object was not selected) and a false positive (e.g., an unintended object was selected). In this example, the interface response may be automatically changed, e.g., selecting the intended object and unselecting the unintended object.

In some implementations, detection of an unexpected user interface behavior triggers presentation of information, content, or options to the user. For example, a message may be presented to the user asking for the user to identify which of one or more identified user interface behaviors, if any, was undesirable or otherwise unexpected. In another example, a message is presented to the user presenting the user with options with respect to actions to be taken. For example, the user may be asked to select which of one or more identified user interface actions should be undone. In another example, the user may be asked to select which of one or more user interface actions that were not taken should now be taken. User responses to such selections may be recorded and learned from. For example, the system may identify or otherwise learn which types of user interface behaviors trigger which types of physiological responses in a particular user.

In some implementations, detecting an unexpected user interface behavior involves identifying the one user interface behavior of multiple potential user interface behaviors that is most likely the cause of the physiological response of the user. For example, within a short time window, a user interface may detect a spoken verbal command (e.g., dimming the lighting) and detect a hand gesture (e.g., a gesture-based object selection). In some implementations, the system disambiguates these potential causes based on the physiological data (e.g., certain types of unexpected behaviors may be associated with certain types of physiological responses) and/or based on the user's subsequent action, e.g., did the user look at the light source or look at the selected object.

Figure 6:
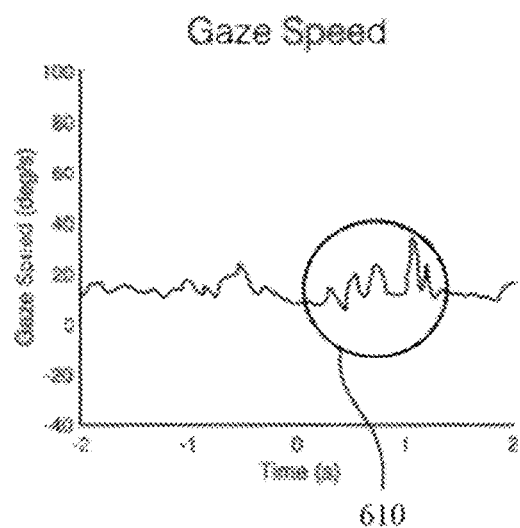
FIG. 6 illustrates exemplary physiological data associated with expected user interface behavior following a touch event.
Figure 6:
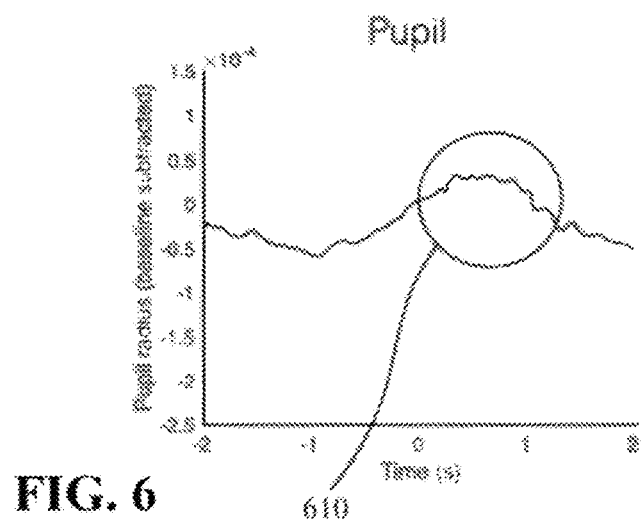

FIG. 6 illustrates exemplary physiological data associated with expected user interface behavior following a touch event. In this example, the gaze speed and pupil radius exhibit respective patterns during a period 610 following an expected user interface response. For example, following a touch event to a touch screen in which the user interface responds appropriately, the user may exhibit these patterns during the period 610. A device may perform techniques disclosed herein to analyze this physiological data during the period 610 and detect that expected user interface behavior occurred prior to the period 610.

Figure 7:
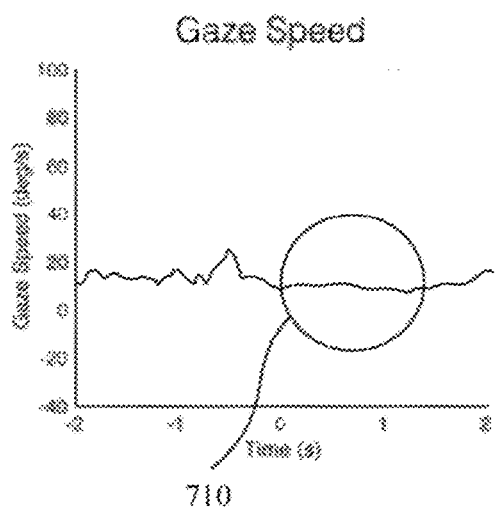
FIG. 7 illustrates exemplary physiological data associated with unexpected user interface behavior following a touch event.
Figure 7:
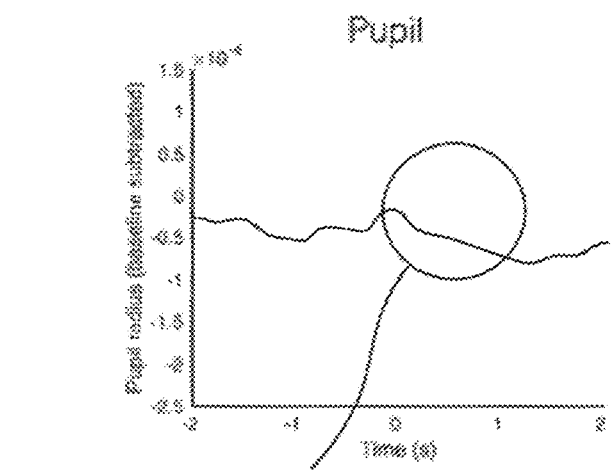

FIG. 7 illustrates exemplary physiological data associated with unexpected user interface behavior following a touch event. In this example, the gaze speed and pupil radius exhibit respective patterns during a period 710 following an unexpected user interface response. For example, following a touch event to a touch screen in which the user interface responds inappropriately (e.g., by not responding to the touch), the user may exhibit these patterns during the period 710. A device may perform techniques disclosed herein to analyze this physiological data during the period 710 and detect that expected user interface behavior occurred prior to the period 710.

Figure 8:
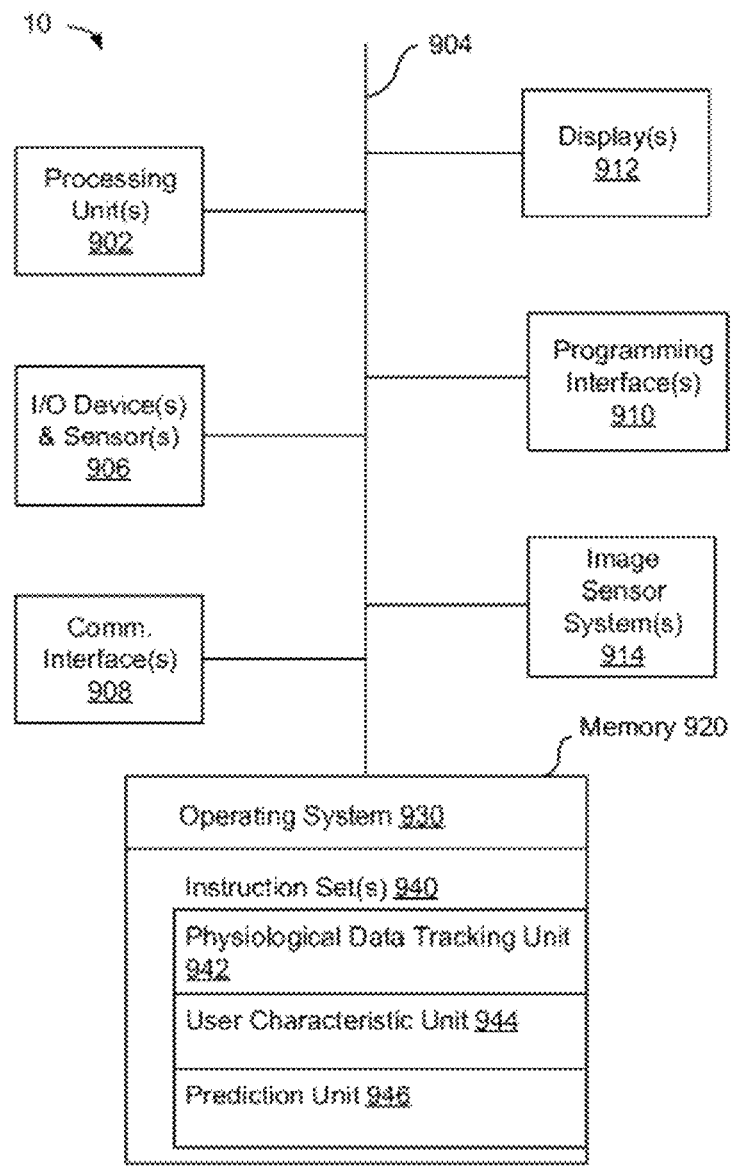
FIG. 8 is a block diagram illustrating device components of an exemplary device according to some implementations.

FIG. 8 is a block diagram of an example of a device 10 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, electroencephalography (EEG) sensor, electrocardiography (ECG) sensor, electromyography (EMG) sensor, functional near infrared spectroscopy signal (fNIRS) sensor, skin conductance sensor, or image sensor, e.g., for pupillary response, etc.), one or more microphones, one or more speakers, a haptics engine, one or more depth sensors (e.g., a structured light, a time-of-flight, or the like), and/or the like.

In some implementations, the one or more displays 912 are configured to present a user experience to the user 25. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), a retinal projection system, and/or the like display types. In some implementations, the one or more displays 912 correspond to diffractive, reflective, polarized, holographic, etc. waveguide displays. In one example, the device 10 includes a single display. In another example, the device 10 includes a display for each eye of the user 25, e.g., an HMD. In some implementations, the one or more displays 912 are capable of presenting extended reality (XR) content, e.g., augmented reality content, virtual reality content, etc.

In some implementations, the one or more image sensor systems 914 are configured to obtain image data that corresponds to at least a portion of the face of the user 25 that includes the eyes of the user 25. For example, the one or more image sensor systems 914 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 914 further include illumination sources that emit light upon the portion of the face of the user 25, such as a flash or a glint source.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 920 and a user experience module 940.

The operating system 930 includes procedures for handling various basic system services and for performing hardware dependent tasks. In some implementations, the module 940 is configured to predict or otherwise determine aspects of a user-to-object contact using physiological data. To that end, in various implementations, the module 940 includes a physiological data tracking unit 942, a user characteristic unit 944, and a prediction unit 946.

In some implementations, the physiological data tracking unit 942 is configured to track a user's pupil, muscles, heart, blood, breath, brain, and/or other physiological attributes using one or more of the techniques discussed herein or as otherwise may be appropriate. To these ends, in various implementations, the unit includes instructions and/or logic therefor, and heuristics and metadata therefor.

In some implementations, the user characteristic unit 944 is configured to determine a user characteristic (e.g., a state, change, or pattern exhibited by the eye, muscles, heart, blood, breath, brain, or other physiological attribute) using one or more of the techniques discussed herein or as otherwise may be appropriate. To these ends, in various implementations, the unit includes instructions and/or logic therefor, and heuristics and metadata therefor.

In some implementations, the prediction unit 946 is configured to predict or otherwise identify an unexpected user interface behavior based on one or more user characteristics using one or more of the techniques discussed herein or as otherwise may be appropriate. To these ends, in various implementations, the unit includes instructions and/or logic therefor, and heuristics and metadata therefor.

Although the units and modules of FIG. 8 are shown as residing on a single device (e.g., the device 10), it should be understood that in other implementations, any combination of these units may be located in separate computing devices.

Moreover, FIG. 8 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 9:
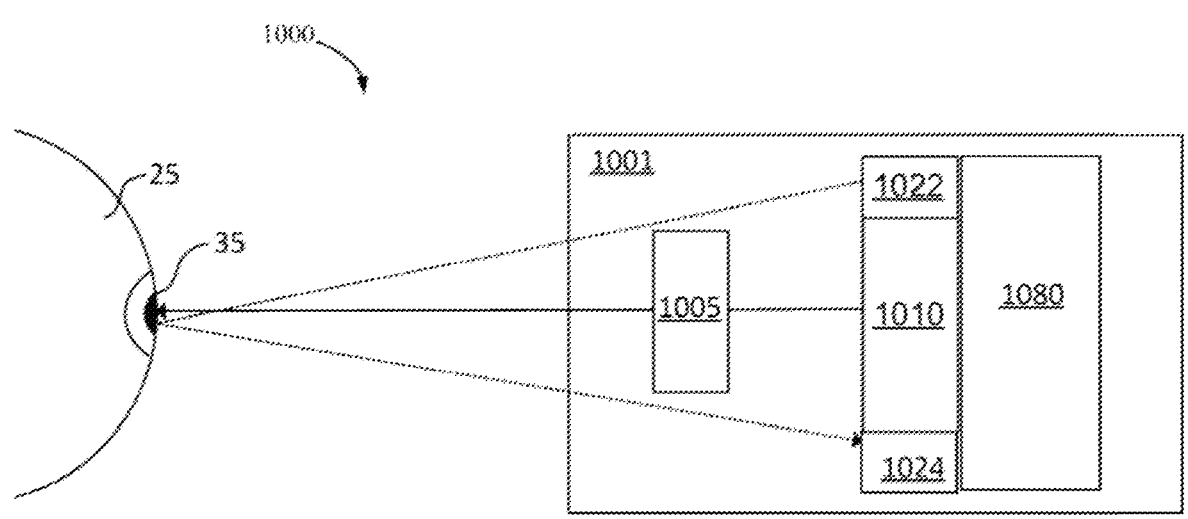
FIG. 9 is a block diagram of an example head-mounted device (HMD) in accordance with some implementations.

FIG. 9 illustrates a block diagram of an exemplary head-mounted device 1000 in accordance with some implementations. The head-mounted device 1000 includes a housing 1001 (or enclosure) that houses various components of the head-mounted device 1000. The housing 1001 includes (or is coupled to) an eye pad (not shown) disposed at a proximal (to the user 25) end of the housing 1001. In various implementations, the eye pad is a plastic or rubber piece that comfortably and snugly keeps the head-mounted device 1000 in the proper position on the face of the user 25 (e.g., surrounding the eye of the user 25).

The housing 1001 houses a display 1010 that displays an image, emitting light towards or onto the eye of a user 25. In various implementations, the display 1010 emits the light through an eyepiece having one or more lenses 1005 that refracts the light emitted by the display 1010, making the display appear to the user 25 to be at a virtual distance farther than the actual distance from the eye to the display 1010. For the user 25 to be able to focus on the display 1010, in various implementations, the virtual distance is at least greater than a minimum focal distance of the eye (e.g., 7 cm). Further, in order to provide a better user experience, in various implementations, the virtual distance is greater than 1 meter.

The housing 1001 also houses a tracking system including one or more light sources 1022, camera 1024, and a controller 1080. The one or more light sources 1022 emit light onto the eye of the user 25 that reflects as a light pattern (e.g., a circle of glints) that can be detected by the camera 1024. Based on the light pattern, the controller 1080 can determine an eye tracking characteristic of the user 25. For example, the controller 1080 can determine a gaze direction and/or a blinking state (eyes open or eyes closed) of the user 25. As another example, the controller 1080 can determine a pupil center, a pupil size, or a point of regard. Thus, in various implementations, the light is emitted by the one or more light sources 1022, reflects off the eye of the user 25, and is detected by the camera 1024. In various implementations, the light from the eye of the user 25 is reflected off a hot mirror or passed through an eyepiece before reaching the camera 1024.

The display 1010 emits light in a first wavelength range and the one or more light sources 1022 emit light in a second wavelength range. Similarly, the camera 1024 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1010 by looking at it), provide foveated rendering (e.g., present a higher resolution in an area of the display 1010 the user 25 is looking at and a lower resolution elsewhere on the display 1010), or correct distortions (e.g., for images to be provided on the display 1010).

In various implementations, the one or more light sources 1022 emit light towards the eye of the user 25 which reflects in the form of a plurality of glints.

In various implementations, the camera 1024 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

Use of personal information and/or physiological data should be done in accordance with established privacy practices recognized as meeting or exceeding industry or governmental requirements. For example, such user data should be collected for legitimate and reasonable uses and not provided or sold other than for those uses. Collection should occur only after based on informed consent of the users. Additionally, it is important to safeguard and secure access to such data and ensure that others with access to the data adhere to the privacy policies. Third parties may be used to certify adherence to privacy policies.

Users may be enabled to selectively block the use of, or access to such dat and/or to "opt in" or "opt out" of participation in the collection of such data. In another example, users may select not to provide such data for particular purposes. In yet another example, users can select to not provide such data, but permit the transfer of anonymous data to improve the functioning of the services or systems.

Thus, although the present disclosure broadly covers use of personal data, it also contemplates that the various embodiments can also be implemented without the need for accessing such personal data. The techniques are not rendered inoperable due to the lack of all or a portion of such personal information data. Data may be stored using a encryption system that only allows the owner of the data to decrypt the stored data. Data may be stored anonymously (e.g., without identifying and/or user info). In this way, third parties may be unable to determine the identity of the user associated with the stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at an electronic device comprising a processor:

obtaining, via a sensor, physiological data of a user during a period of time while the electronic device is in use, wherein the physiological data comprises images of an eye of the user;

determining a characteristic of an eye of the user during the period of time, wherein the characteristic of the eye of the user is determined based on the physiological data, wherein the characteristic of the eye comprises a pupil characteristic indicative of a user reaction to unexpected user interface activity, the pupil characteristic exhibited by a pupil of the eye during the period of time; and identifying an unexpected user interface behavior occurring prior to the period of time based on the characteristic of the eye of the user during the period of time.

2. The method of claim 1, wherein identifying the unexpected user interface behavior comprises determining that a user interface behavior is unexpected based on detecting that the physiological data indicates a type of reaction to the user interface behavior that is associated with an unexpected event occurring rather than an expected event occurring.

3. The method of claim 1, wherein the unexpected user interface behavior is identified using a classifier implemented via a machine learning model or computer-executed algorithm.

4. The method of claim 1, wherein identifying the unexpected user interface behavior comprises identifying a missed detection of a user-movement-based selection.

5. The method of claim 1, wherein identifying the unexpected user interface behavior comprises identifying a missed detection of a user-to-object contact.

6. The method of claim 1, wherein identifying the unexpected user interface behavior comprises identifying a false detection of a user-movement-based selection.

7. The method of claim 1, wherein identifying the unexpected user interface behavior comprises identifying a false detection of a user-to-object contact.

8. The method of claim 1, wherein the physiological data comprises images of the eye, and the characteristic comprises a gaze direction, a gaze speed, or a pupil radius.

9. The method of claim 1, wherein the physiological data comprises electrooculography (EOG) data, and the characteristic comprises a gaze direction or a gaze speed.

10. The method of claim 1 further comprising, based on identifying the unexpected user interface behavior, presenting information, content, or options.

11. The method of claim 1, wherein the pupil characteristic is a pupil radius pattern exhibited by the pupil of the eye during the period of time.

12. The method of claim 1 further comprising determining a second characteristic of the eye of the user during the period of time, wherein the second characteristic of the eye comprises a gaze characteristic exhibited by the eye during the period of time, wherein the unexpected user interface behavior is determined based on both the characteristic of the eye and the second characteristic of the eye.

13. The method of claim 1 further comprising determining a second characteristic of the eye of the user during the period of time, wherein the second characteristic of the eye comprises a gaze speed pattern exhibited by the eye during the period of time, wherein the unexpected user interface behavior is determined based on both the characteristic of the eye and the second characteristic of the eye.

14. The method of claim 1, wherein the pupil characteristic is indicative of surprise, shock, or a negative reaction.

15. The method of claim 1, wherein the unexpected user interface behavior is identified based on a gaze speed pattern and a pupil radius pattern.

16. The method of claim 1, wherein the unexpected user interface behavior is identified based on a gaze speed characteristic and a pupil radius characteristic.

17. An electronic device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:

obtaining, via a sensor, physiological data of a user during a period of time the electronic device is in use, wherein the physiological data comprises images of an eye of the user;

determining a characteristic of an eye of the user during the period of time, wherein the characteristic of the eye of the user is determined based on the physiological data, wherein the characteristic of the eye comprises a pupil characteristic indicative of a user reaction to unexpected user interface activity, the pupil characteristic exhibited by a pupil of the eye during the period of time; and identifying an unexpected user interface behavior occurring prior to the period of time based on the characteristic of the eye of the user during the period of time.

18. The device of claim 17, wherein the unexpected user interface behavior is identified using a classifier implemented via a machine learning model or computer-executed algorithm.

19. The device of claim 17, wherein identifying the unexpected user interface behavior comprises identifying a missed detection of a user-movement-based selection.

20. The device of claim 17, wherein identifying the unexpected user interface behavior comprises identifying a missed detection of a user-to-object contact.

21. The device of claim 17, wherein identifying the unexpected user interface behavior comprises identifying a false detection of a user-movement-based selection.

22. The device of claim 17, wherein identifying the unexpected user interface behavior comprises identifying a false detection of a user-to-object contact.

23. The device of claim 17, wherein the physiological data comprises images of the eye, and the characteristic comprises a gaze direction, a gaze speed, or a pupil radius.

24. The device of claim 17, wherein the physiological data comprises electrooculography (EOG) data, and the characteristic comprises a gaze direction or a gaze speed.

25. A non-transitory computer-readable storage medium, storing computer-executable program instructions on a computer to perform operations comprising:

obtaining, via a sensor, physiological data of a user during a period of time while an electronic device is in use, wherein the physiological data comprises images of an eye of the user;

determining a characteristic of an eye of the user during the period of time, wherein the characteristic of the eye of the user is determined based on the physiological data, wherein the characteristic of the eye comprises a pupil characteristic indicative of a user reaction to unexpected user interface activity, the pupil characteristic exhibited by a pupil of the eye during the period of time; and identifying an unexpected user interface behavior occurring prior to the period of time based on the characteristic of the eye of the user during the period of time.

26. The non-transitory computer-readable storage medium of claim 25, wherein the unexpected user interface behavior is identified using a classifier implemented via a machine learning model or computer-executed algorithm.

* * * * *